UNITED STATES PATENT OFFICE.

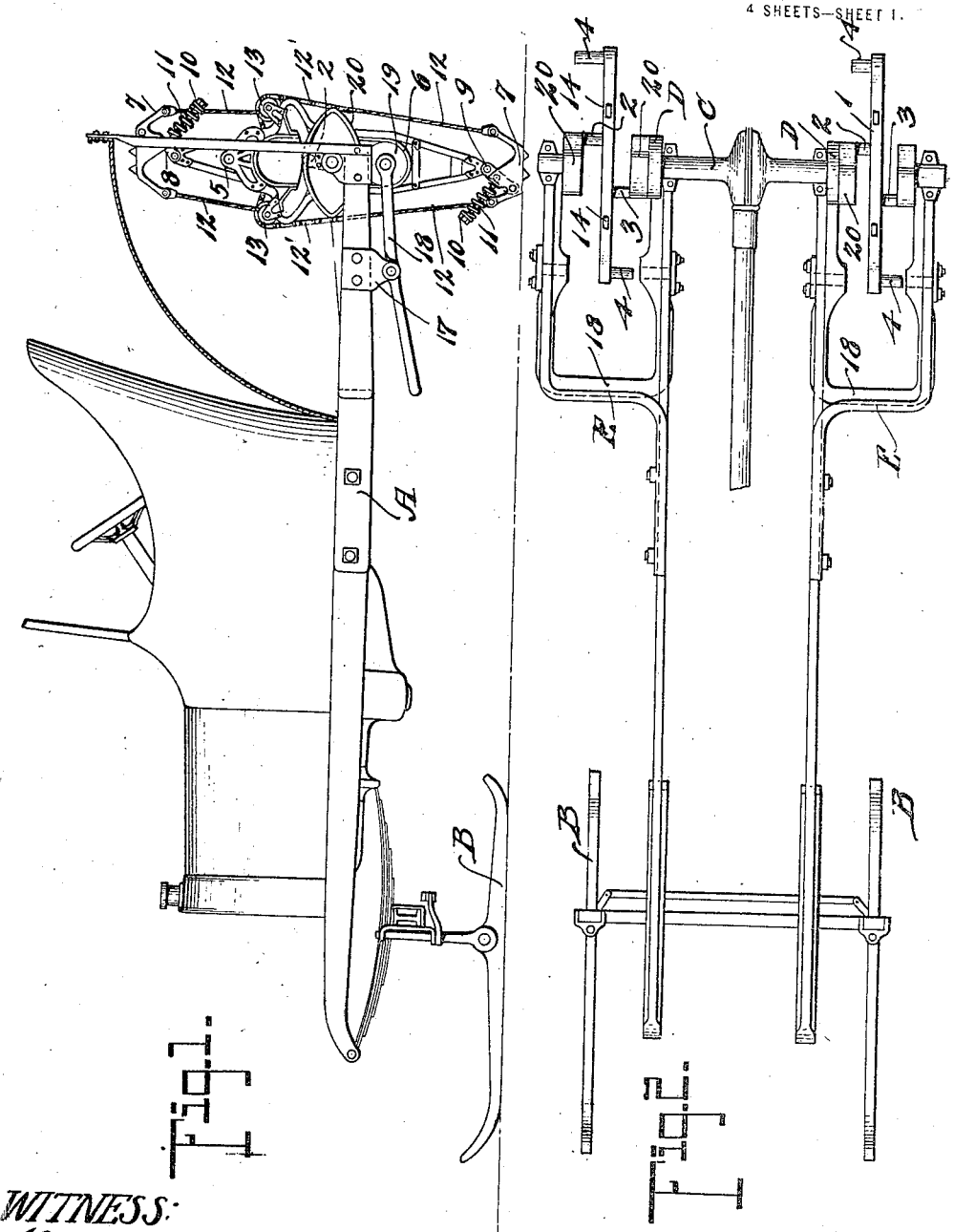

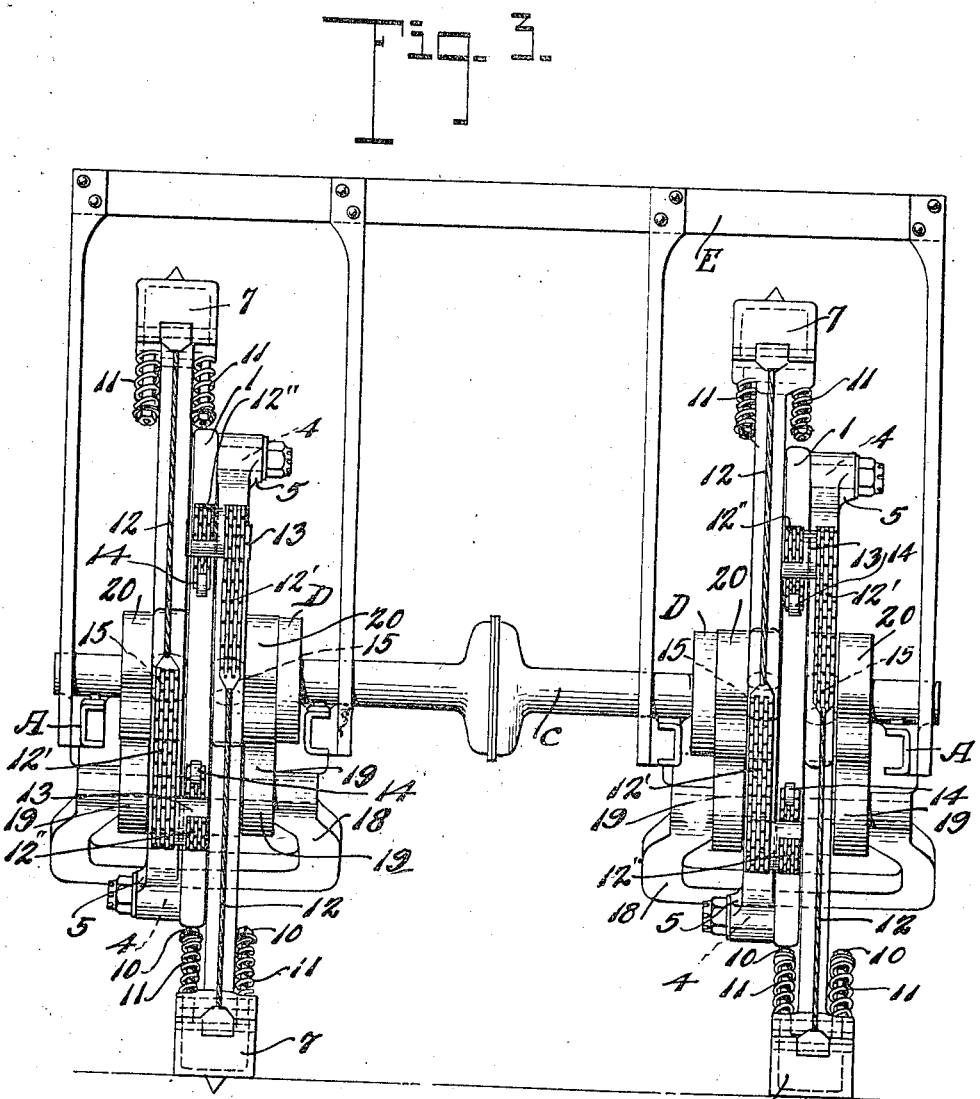
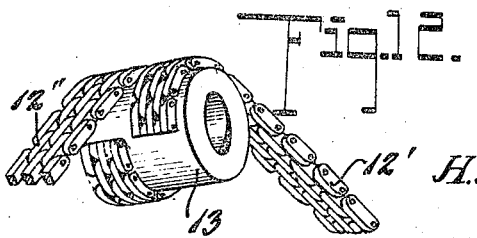

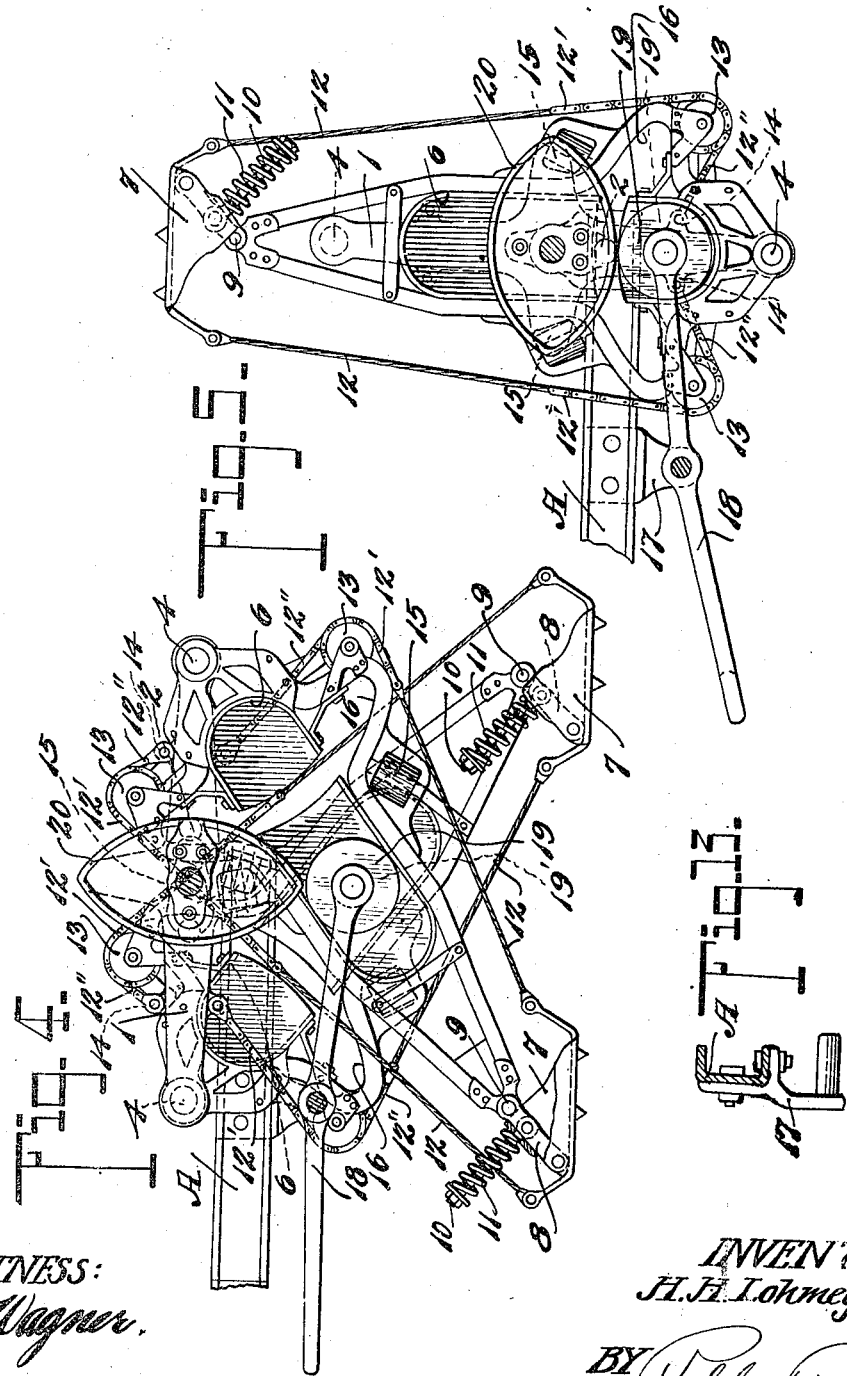

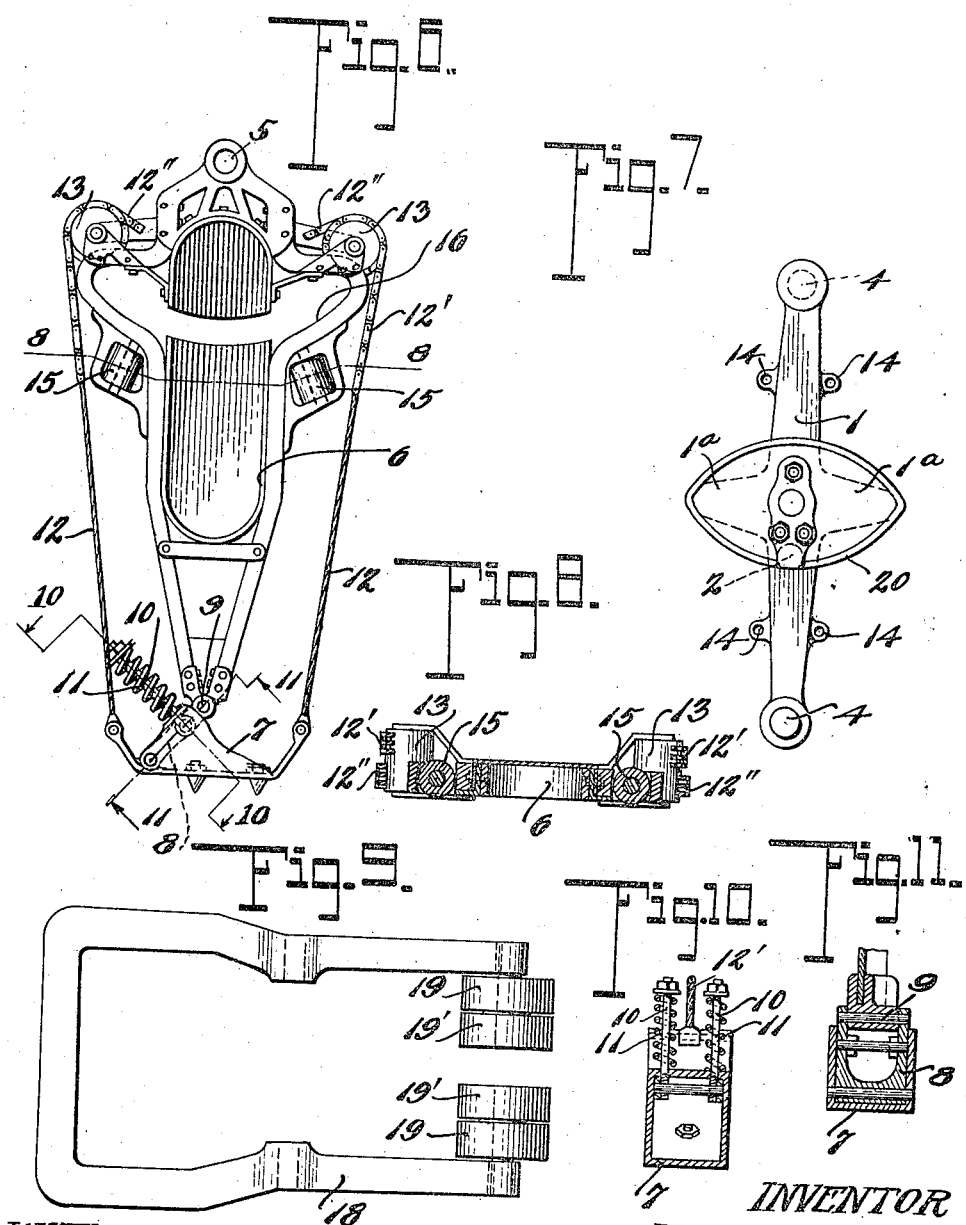

HENRY H. LOHMEYER, OF AMBROSE, NORTH DAKOTA.

TRACTION DEVICE FOR MOTOR-VEHICLES.

1,296,981.  Specification of Letters Patent.  Patented Mar. 11, 1919.

Application filed April 19, 1918. Serial No. 229,598.

*To all whom it may concern:*

Be it known that I, HENRY H. LOHMEYER, a citizen of the United States, residing at Ambrose, in the county of Divide and State of North Dakota, have invented certain new and useful Improvements in Traction Devices for Motor-Vehicles, of which the following is a specification.

The present invention has to do with improvements in motor vehicles and in particular to tractive devices or special propulsion means therefor. The mechanism is embodied in that type of these devices which is best known as steppers from the similarity in the manner in which the propelling instrumentalities operate to the action of walking.

The primary object in view is to provide means of this class for propelling vehicles of various types with a maximum tractive effort particularly over soft, slippery, sandy and dirt roads or fields, though it is not essentially limited as regards its utility for travel over surfaces of this character.

It is further an object to provide propelling instrumentalities which move with a variation of speed so that they maintain a supporting and propelling relation to the surface for a relatively long period of their movement while passing through the other stage of their movement with rapidity to again assume the same relation for continuation of their function.

Another object is to provide an arrangement for producing this variation of movement through a shifting of the axis of rotation of the propelling means; this arrangement furthermore having as its objective the maintenance of the extremity of each propelling member when it arrives at a point of contact with the surface of the ground in such relative position throughout its surface contacting movement.

A still further object is the provision of suitable feet for the propelling members which are shiftable automatically incident to the operation of said members so as to maintain a horizontal position affording proper contact with the surface over which they are operated and in addition the construction of such feet as to provide for yieldability in order to absorb shocks of impact with hard surfaces.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a side elevation showing the application of this invention to one type of motor vehicle;

Fig. 2 is a top plan of a skeleton of the support, showing more clearly the construction of the actuating means for the propelling instrumentalities used with this device;

Fig. 3 is a rear elevation of the traction mechanism;

Fig. 4 is a fragmentary sectional view showing more clearly in elevation the propelling members in their surface engaging and supporting relation;

Fig. 5 is a similar view showing one of the propelling members in its uppermost position out of contact with the supporting surface;

Fig. 6 is a side elevation of one of the propelling members alone;

Fig. 7 is a detail view of the actuator for the propelling members;

Fig. 8 is a transverse sectional view on the line 8—8 of Fig. 6;

Fig. 9 is a top plan view of the movable frame constituting the shifting axis for the propelling members;

Figs. 10 and 11 are detail sectional views on the lines 10—10 and 11—11, respectively, of Fig. 6;

Fig. 12 is a detail perspective view of the intermediate connection of one of the flexible shoe actuating members;

Fig. 13 is a detail view of a bracket for the shiftable frame.

Throughout the following detail description and on the several figures of the drawings, similar parts are referred to by like reference characters.

It is to be understood at the outstart that the traction devices forming the subject matter of this invention are applicable to any type of power driven vehicles and that which is illustrated herein is exemplary only of the manner in which the device may be applied to one of such types. To this end, A indicates the chassis or body of a motor vehicle, the forward portion of which may be suitably supported by runners B while the rear portion is properly supported and driven through the mechanism forming my special invention. The driving axle operated by a suitable prime mover is contained in the casing C and is provided with brake drums D. At each side the chassis or frame is substantially U-shaped as indicated at E and mounted between the sides of the U-shaped construction is the actuator or driving arm 1, it being understood that the mechanism for one side of the vehicle is duplicated at the opposite side.

The actuator is operatively connected with the driving axle by the crank pin 2 at one side and said actuator is similarly provided with an opposite pin 3. At each extremity of the actuator is a laterally projecting pivot pin 4 and upon each one of these pivots is mounted or connected a propelling member or leg such as shown particularly in Fig. 6. Since these propelling members are duplicates of each other, one only will be described.

Referring to Fig. 6, 5 indicates the point of pivot connection of the propelling member with the actuator pin 4, this member being obviously completely rotated by the actuator when the vehicle is driven over the surface of the ground. Extending longitudinally of the member or leg is a channel plate 6 while at the lower or free extremity the member is provided with a foot piece or shoe 7. This shoe is pivotally connected to the member by links 8 at one end, the pivot connections being indicated at 9. The links carry the adjusting bolts 10 surrounded by spiral springs 11 which seat against the side of the shoe and provide for yielding of the shoe when the latter contacts with the surface of the ground. At each end the shoe is operatively connected with the actuator by means of flexible connections 12. Each of these connections consists of the section 12' which is connected to the roller 13 mounted at the upper part of the leg and a second section 12" similarly connected to said roller and to an apertured lug 14 on the actuator. The leg furthermore carries friction rollers 15 at an intermediate point and is so constructed as to provide a transverse slot 16 near its upper end accommodating the particular pin 2 which is movable in said slot as the leg is shifted about its axis of rotation.

Depending from each side of the vehicle frame A is a suitable bracket 17 upon which is swingingly mounted the substantially U-shaped frame 18. The frame takes this shape simply as a convenient form of construction but in the action of the device the side members of the frame may each be considered simply as an arm pivoted intermediate its length. At the extremity of each arm is mounted a pair of friction rollers 19—19', the latter projecting into the channel plate 6 of the leg contiguous thereto and the former bearing against a substantially elliptical cam 20 which lies contiguous to the side of the leg and is fixed for rotation with the actuator 1 in performing its function more clearly set forth hereinafter.

The foregoing describes briefly the essential structural characteristics of the traction means of my device and the special mode of operation thereof will now be set forth.

It is obvious that as the actuator 1 is driven by the prime mover for the vehicle it rotates at a constant speed and carries with it the respective propelling members or legs so that these prescribe a complete rotation. However, as the driving connection for the respective legs is at one end thereof and the side member or arm of the frame 18 coacts with the leg at an intermediate point through the instrumentality of the friction roller 19' the leg in addition to its true rotative movement has oscillatory movement imparted thereto. In other words, the roller 19' projecting into the channel plate 6 of a leg constitutes the axis of rotation for said leg and as the leg revolves the frame 18 is free to move up and down and thus shifts the axis of rotation to and from the pivot connection of said leg with the actuator. This is best seen by a comparison of Figs. 4 and 5. In the former it will be noted that the axis of rotation above referred to when the extremity of the leg or propelling member is in contacting relation with respect to the surface is at a point farthest from the pivot connection 4 and as the leg moves from its contact with the surface to a non-contacting portion of its travel the axis moves upwardly, relatively speaking, in the channel 6 and toward the point of pivotal connection. Obviously a change of leverage has taken place and also obviously the leg is bound to move at a different speed.

Specifically, when the axis of rotation is farthest from the pivot point the speed of rotation is relatively slow and when closest to the pivot point it is relatively fast. I avail myself of this differential speed by the arrangement for the relatively slow speed during contact of the leg extremity with the surface so that a maximum supporting and tractive effort is obtainable, while as soon as the leg moves from contact with the surface it will pass through the other portion of its arc of travel quickly until it again assumes its forward contacting relation with respect to the surface. I am thus able to use a minimum number of these propelling devices.

Not only is the foregoing an important arrangement in a device of this character but I provide for a further important feature now to be described.

Obviously if the frame or chassis of the vehicle is to be maintained relatively level during propulsion by devices of this character, some means for compensating for the movement of the leg about its shiftable axis is desirable. To this end I have provided for each leg an elliptical cam 20 above referred to, said cam coacting with the side of the U-shaped frame 18 carrying the roller 19. This cam maintains the relative position of the axis in such manner that the extremity of the propelling member will remain operative through a true horizontal plane from the time it contacts with the surface of the ground until it leaves the surface in its rearward travel. This will be quite obvious from a consideration of Figs. 4 and 5.

During the rotation of the leg member the shoe at the end thereof is automatically actuated so that the under surface of the same will remain horizontal throughout its contact with the surface of the ground and the shifting of the shoe is made effective through the instrumentality of the operative connections 12 which are actuated as the relative position of the respective rollers 13 changes with regard to the actuator 1.

The cushioning action of the shoes is brought into play by reason of the pivot connections of the shoe link 8 and the arrangement of the springs 11. As the link moves on its pivots the springs 11 are compressed against the side of the shoe away from which the link moves, this side of the shoe limiting the return movement of the link as the spring expands and the relationship of the parts becomes normal.

It may furthermore be noted that the actuator 1 is provided centrally thereof with lateral arms 1ª, these arms constituting the contacting surfaces for the friction rollers 15 of the legs at one side while the cam adjacent to the side of the leg constitutes the contacting surface for the rollers at the opposite side, this arrangement being desirable to provide for guiding of the leg as it oscillates across the longitudinal axis of the actuator during the rotative movement in the manner hereinbefore set forth.

Having thus described my invention, what I claim as new is:—

1. In a traction device, the combination of a driving shaft, an actuating member driven thereby and having a crank pin at opposite sides thereof, a propelling member pivotally connected at each side of the actuating member to engage the surface of the ground to provide impulsion, said propelling members being revoluble about said pins by the actuating member to successively contact with the ground, and means coacting with the propelling members for prolonging the contact of each of the same with the ground and subsequently accelerating their movement into contacting relation with respect thereto.

2. In a traction device of the class described, the combination of an actuator, a propelling member connected to the actuator at one end, the other end thereof being rotatable from contacting position with respect to the ground about the axis of said actuator and over said axis into contacting relation again, and means for oscillating the propelling member relative to the actuating member during the rotation to accelerate the movement of the contacting end of the propelling member when out of contact with the ground surface.

3. In a traction device of the class described, the combination of an actuator, a propelling member connected to the actuator at one end, the other end thereof being rotatable from contacting position with respect to the ground about the axis of said actuator and over said axis into contacting relation again, and means for swinging the propelling member across the longitudinal axis of said actuator during the rotation of said propelling member over the axis as aforesaid.

4. In a traction device of the class described, the combination of an actuating member, a propelling member having connection with the actuating member at one end of the former about which the propelling member is revoluble, and means coöperating with the propelling member at a point spaced from said connection for imparting oscillatory movement to the propelling member during rotation.

5. In a traction device of the class described, the combination of an actuating member, a rotary propelling member having actuating connection with said actuating member, and operable means engageable with the propelling member intermediate its length to shift the propelling member relative to the actuating member and constituting the axis of rotation of said propelling member about which the latter is revoluble.

6. In a traction device of the class described, the combination of an actuating member, a propelling member having actuating connection with said actuating member about which connection the former rotates, and shiftable means engageable with the propelling member intermediate its length and constituting the axis of rotation of said propelling member about which the latter is also revoluble, whereby to vary the speed of movement of the propelling member during rotation.

7. In a traction device of the class described, the combination of an actuating member, a propelling member having actuating connection with said actuating member, and means engageable with the propelling member intermediate its length and shiftable longitudinally of the same as an incident of the movement of the propelling member and constituting the axis of rotation of said member about which the latter is revoluble, and means coacting with the last mentioned means for maintaining travel of the extremity of the propelling member in a horizontal plane during a portion of its movement.

8. In a traction device of the class described, the combination of an actuating member, a propelling member connected therewith, a member movably supported adjacent to the propelling member and relatively stationary with respect to the actuating member and having one end thereof engageable with said propelling member, and means operable with the actuating member and coacting with the movable member aforesaid to shift the same to vary the radius of movement of the propelling member for maintaining the travel of the extremity of the propelling member in a horizontal plane throughout the surface contact.

9. In a traction device of the class described, the combination of a supporting frame, an arm swingingly supported thereon, an actuator carried by said frame adjacent to the arm, a propelling member connected to said actuator and operated therefrom, and means on said swinging arm engageable with the propelling member and constituting an axis about which the propelling member is movable.

10. In a traction device of the class described, the combination of a supporting frame, an arm swingingly supported thereon, an actuator carried by said frame adjacent to the arm, a propelling member connected to said actuator and operated therefrom, means on said swinging arm engageable with the propelling member and constituting an axis about which the propelling member is movable, and a cam fixed for movement with the actuator and engageable with the swinging arm for maintaining the extremity of the propelling member in a horizontal plane during a portion of its travel.

11. In a traction device of the class described, the combination of a rotatable actuator, a propelling member adapted to contact with the ground pivotally connected to said actuator, the ground contacting end of said propelling member being movable from the contacting relation with respect to the ground rotatably about and over the pivotal connection aforesaid during propulsion of the device, and said propelling member being oscillatory with respect to the actuator during a portion of its rotation as aforesaid to effect acceleration of its motion during such portion of its rotation.

12. In a traction device of the class described, the combination of an actuator, a leg member pivotally connected at its end to said actuator, a swinging arm mounted adjacent to said leg member and having a projection at its end portion, a channel in said leg to receive the projection aforesaid, said projection being movable in said channel toward and from the pivot connection of the leg with the actuator whereby to effect a change of leverage and rate of movement of the leg during operation thereof.

13. In a traction device of the class described, the combination of a rotatable actuator, a leg swingingly connected to said actuator, an arm pivotally supported adjacent to said leg and having a projection slidably engaging the leg, said projection being movable toward and from the pivot connection between said leg and actuator, and a cam operable with the actuator and coacting with the projection aforesaid to control the sliding movement thereof with respect to the leg.

14. In a traction device of the class described, the combination of a pair of rotative leg members, an actuator common to said leg members for operating the same, and a frame member swingingly supported adjacent to said leg members and having a projection coöperating with each of said leg members, said projections constituting the axes of rotation of the respective members.

15. In a traction device of the class described, the combination with a vehicle frame, of propelling means for the vehicle comprising a pair of rotative leg members, an actuator arranged intermediate said leg members with which each leg member has pivot connection, a frame member swingingly mounted upon the vehicle frame and shiftably connected with said leg members, said frame member being movable vertically to vary its coöperation with the leg members and thereby vary the speed of rotation of said members.

16. In a traction device of the class described, the combination with a vehicle frame, of propelling means for the vehicle comprising a pair of rotative leg members, an actuator arranged intermediate said leg members with which each leg member has pivot connection, a frame member swingingly mounted upon the vehicle frame and shiftably connected with said leg members, said frame member being movable vertically to vary its coöperation with the leg members and thereby vary the speed of rotation of said members, and cams arranged at opposite sides of the leg members and coacting with the shiftable frame member.

17. In a traction device of the class described, the combination with a vehicle frame, of propelling means for said vehicle including a motor, a revoluble actuator driven by said motor, leg members pivotally connected to said actuator and revoluble therewith, a U-shaped frame member pivotally connected to the vehicle frame and carrying friction rollers at one end, each leg member having a channel extending longitudinally thereof to receive the friction rollers aforesaid, said rollers being movable in said channel toward and from the pivot connections of the leg members with the actuator, cams arranged adjacent to the friction rollers and coöperative therewith for holding the frame member against movement during a portion of the travel of the leg members, foot pieces movably connected to the leg members, and flexible connections intermediate the foot pieces, the leg members and actuator.

18. In a traction device of the stepper type, the combination of driving means, an actuator operable thereby, a stepper device connected to said actuator and revoluble relative thereto, means coacting with said stepper device for effecting relative movement during the revolution of said stepper device, said device having a channel with which said last mentioned means engages for movement therealong during operation and a cross slot, said stepper device having means projecting into said cross slot and limiting the relative movement aforesaid.

19. In a traction device of the stepper type, the combination of a driving axle, actuating arms connected to said axle, stepper devices connected to said actuating arms, a frame member swingingly mounted adjacent to said stepper devices and embodying arms engaging the same and movable synchronously to shift said arms during operation of said devices, projections on said stepper devices coacting therewith to limit relative movement of said stepper devices with respect to the actuating arms, and means operable by the driving axle with which the frame arms aforesaid coact to effect shifting of said arms with respect to said stepper devices.

In testimony whereof I affix my signature.

HENRY H. LOHMEYER.